United States Patent [19]

Van Note

[11] 4,203,231
[45] May 20, 1980

[54] DISSECTING BOARD AND PROCESS FOR DISSECTING A SPECIMEN

[76] Inventor: Richard Van Note, 456 Woodfield Trail, Roselle, Ill. 60172

[21] Appl. No.: 868,710

[22] Filed: Jan. 11, 1978

[51] Int. Cl.² ............................................ G09B 23/36
[52] U.S. Cl. ........................................ 35/20; 428/217
[58] Field of Search ................ 35/20; 269/15, 53, 54, 269/289, 302.1, 322, 327; 428/217, 409, 462

[56] References Cited

U.S. PATENT DOCUMENTS

| | | | |
|---|---|---|---|
| 163,552 | 5/1875 | Van Velsor | 269/302.1 |
| 514,096 | 2/1894 | Sheffield | 269/54 |
| 1,513,938 | 11/1924 | Shea | 269/289 X |
| 2,094,183 | 9/1937 | Nobbe | 428/217 |
| 3,143,457 | 8/1964 | Morris | 428/217 X |
| 4,096,307 | 6/1978 | Lagowski | 428/462 X |

FOREIGN PATENT DOCUMENTS

481396  3/1938  United Kingdom ................... 428/462

OTHER PUBLICATIONS

Disecting Pans & Boards, pp. 576-579 of Carolina Biological Supply Co. Catalog for 1966-1967.

*Primary Examiner*—Harland S. Skogquist
*Attorney, Agent, or Firm*—Carl C. Batz

[57] ABSTRACT

A dissecting board having a glass base and a plastic cutting pad on top of the glass base, the pad being of a thickness and hardness to permit pinning a specimen on the pad and to permit some penetration of the dissecting knife but to prevent contact of the knife with the glass base and consequent dulling of the knife during normal practice of dissection; and a pan in which such board and dissected specimen may be contained when being moved and whereby spillage of liquids is avoided. Also processes in which a specimen to be dissected is pinned to the pad, dissected, removed and the board cleaned for reuse, and processes in which the board is placed in a container and moved to another position, more particularly where the glass base is tinted and the specimen photographed against the tinted glass base. A further feature is the provision of a permanent printed scale in an edge portion of the glass base.

2 Claims, 5 Drawing Figures

U.S. Patent
May 20, 1980
4,203,231
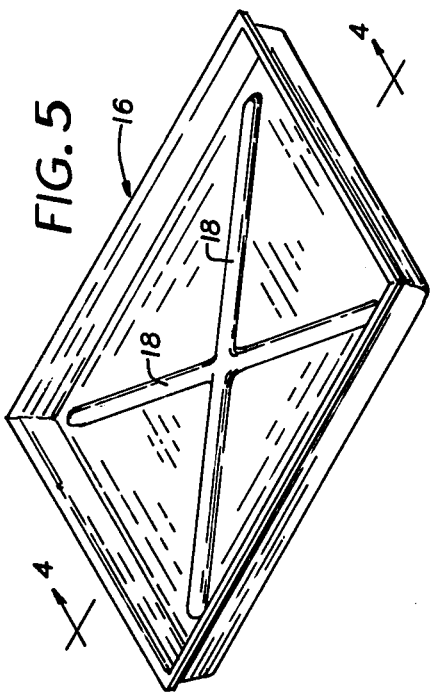

DISSECTING BOARD AND PROCESS FOR DISSECTING A SPECIMEN

This invention pertains to a dissecting board to be used in the dissection of tissues of plants and animals including human tissues. The invention further deals with processes for conducting dissection procedures in which such dissecting board is utilized.

BACKGROUND

In the laboratories of hospitals, in laboratories engaged in biological research and in educational institutions where students engage in biological studies, there is a need for facilities where specimens can be dissected and examined. It has been common to use dissecting boards made of wood and the specimens to be dissected may be pinned down to the surface of the board. In this condition the specimens may be cut with sharp knives against the wood of the board.

The specimens usually come in an untidy condition and contain moisture, blood or fluids of various kinds, so that when the specimens are cut during the course of dissection, the blood, juices or the like are absorbed into the wood of the board and cannot be completely extracted when the board is cleaned as by washing. Repeated use of the wood boards quickly results in foul odors and a generally unsanitary condition. The result would be the same if the board were made of any hitherto known material other than wood which gives adequate support to which a specimen could be pinned and which would not dull the delicate surgical knives which are employed in this practice.

Accordingly, objects of this invention are to provide a dissecting board and associated equipment which can be adequately and completely cleaned free from absorbed juices as a result of use, which will permit a specimen to be pinned to it, which will provide adequate support as a background against which cutting may be done, and which will not dull the cutting edge of the knives used in the dissection. Further, it is desired to provide such dissecting equipment which confines liquid and juices issuing from the specimen, and to provide facilities which will permit moving the specimen on the board from place to place without spillage, and which facilitates photography of the specimen.

DESCRIPTION

One embodiment of my improved dissecting equipment is illustrated in the accompanying drawing in which—

FIG. 1 is a plan view of the improved dissecting board with its pad in place;

FIG. 2 is a sectional view of the board as shown in FIG. 1, the section being taken as seen from line 2—2 of FIG. 1;

FIG. 3 is a perspective view of the board as it may be used and showing a specimen pinned and placed ready for dissection;

FIG. 4 is a sectional view of the pan into which the board, with the specimen thereon, may be placed, the section being taken along line 4—4 of FIG. 5; and FIG. 5 is a perspective view of the pan illustrated in FIG. 4 showing the configuration of ribs on the pan bottom.

As illustrated, the improved dissecting board includes a base 10 which is made of glass and is generally rectangular in shape, with rounded corners, and having a flat top surface 10a. In the manufacture of the glass base 10, I prefer that it be given heat treatment such as is known to the art to temper it and give added strength. Such glass is known as "tempered" glass. Tempered glass is now being manufactured and sold under the trademark Pyramic. The glass, especially the tempered glass, is non-porous, non-absorbent and does not stain or warp. It is impervious to acids and detergents and is not subject to attack by bacteria. Further, the tempered glass is strong and is not likely to break even if it should be dropped.

I prefer that during the manufacture of the glass base 10 to place on at least one edge portion of the base 10 a scale in centimeters or inches, by applying white graphics to the edge portion so that as a result of the heat treatment the scale is permanently embedded in the glass and will not be removed when the board is washed or otherwise cleaned. This scale 11 is shown as being applied to an edge portion of the glass base 10.

Also I prefer to tint the glass during its manufacture. Suitably the glass may be given a tint of color which contrasts with the color of the specimen, or if black and white photography is to be used, the ideal tint may be gray, so as to provide an improved background for photographing the specimen against the glass base.

The glass base 10 may be about 3/16 inch to about 5/16 inch in thickness, preferably about ¼ inch in thickness. By using tempered glass a thickness of ¼ inch or somewhat less provides adequate strength and is relatively light in weight. When tempered glass is not to be used, the glass base may be of a thickness up to 5/16 inch or greater. It is preferable to use only such strength as is adequate because greater thickness of the base increases its weight and makes it less convenient to handle.

On the underside of base 10, are the legs 13 which may be of rubber or plastic material. As shown, these legs are located at each corner and may be secured to the base with adhesive. The legs serve to prevent sliding and rocking when the base is resting on a supporting surface.

A plastic pad 14 is placed on top the base 10, and may be secured thereto by adhesive. This pad, as illustrated, is smaller in area than the glass base and is placed over a portion of the base which is apart from the scale 11. The pad need not cover all of the available surface of the base, and a portion of the base may be left uncovered, preferably a portion next to the scale 11, to facilitate photographing of the specimen along with the scale.

The pads may be formed of a plastic material such as polychloroprene which is a synthetic rubber made by polymerizing chloroprene, or urethane, which is ethyl carbomate, or an equivalent plastic material. Polychloroprene and urethane are known to the art. Polychloroprene is commercially sold under the trademark Neoprene. The pads may have a thickness of at least about 3/16 inch, preferably about ¼ inch (a thickness of about 3/16 inch to 5/16 inch has been found to provide a good pad), and a hardness of about 55 to 65 durometers, preferably about 60 durometer. If the pads have a thickness of less than about 3/16 inch or a hardness of less than about 55 durometer, there is danger that the dissecting knife edge may pass through the plastic pad and be dulled by contact with the glass base. Also if the pad has a hardness of more than about 65 durometer, there is danger that the knife edge will not be received sufficiently into the pad and its blade edge be dulled by contact with the pad.

The pads 14 may be sold in packages separate from the base 10, and in the practice of the improved dissecting procedure, a surgeon or student may take a pad from the separate package and adhesively attach it to a portion of the top of the base.

A specimen such as a frog or portion thereof to be dissected may be placed on top the pad and pins 15 stuck through the specimen and into the pad. When the pins penetrate the plastic pad they hold the specimen at least as well as if they were to be stuck into a wood dissecting board, and the person who does the cutting has the same sense of support back of the specimen as if the board were wood. Also the person doing the dissecting may feel free to cut through the specimen without fear of dulling the knife since the pad will yield to the knife blade and will receive the edge without dulling it.

When the dissection is finished, the sectioned specimen may be removed and the board washed in soap or other detergent or autoclaved to completely remove any remains of the specimen, and the board reused when needed again.

Optionally, the pad which was adhesively secured may be peeled off to separate it from the glass base, and when the board is to be again used, a new pad may be taken from its package and put on the surface of the glass base.

The improved dissecting board with the dissected specimen thereon may be placed in the pan 16. This pan, as shown in FIGS. 4 and 5, may have a flat bottom 17 except for the ridges 18 which extend upwardly from the bottom 17 and provide a support for the base 10 above the bottom of the pan. The drainage from the specimen is contained on the bottom of the pan below the glass base, and if desired an amount of water may be kept on the bottom of the pan to dilute the fluids which drain from the specimen thus to prevent drying of the drained liquids.

The pan 16 may be made of any suitable material, preferably a plastic material such as polystyrene resin.

When the board, carrying a dissected specimen, is placed in the pan, the pan containing the board and the specimen may be conveniently carried and moved about as necessary in the laboratory. The ribs or ridges 18 on the pan bottom reduce spillage and reduce the splashing about of liquids on the bottom of the pan. This function is carried out effectively especially when the ridges 18 are in a crossed pattern such as illustrated in FIG. 5.

When photographs of the dissected specimen or parts thereof are desired the board and specimen parts contained in the pan 16 may be moved to a camera station, and with the specimen portions on the glass base, they may be photographed against the background of the glass base. This is of special advantage when the glass is tinted in a contrasting color or when it has a gray tint so as to show accurately the different shades of light and dark.

While I have illustrated and shown in detail only one embodiment of this invention, it will be apparent to those skilled in this art that many other embodiments of the invention may be constructed and utilized and that many changes and variations may be made in the structure of the device and the process employed without departing from the spirit of the invention and that such other embodiments, changes and variations are within the scope of the appended claims.

What is claimed:

1. A dissecting board comprising a glass base having a flat top surface, and a plastic pad on top of said base, said pad covering only a portion of said base leaving an edge portion of said base uncovered, said uncovered edge portion having thereon a scale for measuring specimens used in dissection, said pad having a thickness of at least ⅛ inch and a hardness of from 55 to 65 durometer.

2. A dissecting board as set forth in claim 1 in which said scale is fired in said base to permanently attach it thereto.

* * * * *